(12) United States Patent
Brushkivskyy et al.

(10) Patent No.: US 12,209,617 B2
(45) Date of Patent: Jan. 28, 2025

(54) ACTUATING DEVICE FOR A TRANSMISSION

(71) Applicant: ZF Friedrichshafen AG, Friedrichshafen (DE)

(72) Inventors: Vyacheslav Brushkivskyy, Kressbronn am Bodensee (DE); Patrick Kniess, Aulendorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/245,974

(22) PCT Filed: Sep. 8, 2021

(86) PCT No.: PCT/EP2021/074696
§ 371 (c)(1),
(2) Date: Mar. 20, 2023

(87) PCT Pub. No.: WO2022/063578
PCT Pub. Date: Mar. 31, 2022

(65) Prior Publication Data
US 2023/0341006 A1    Oct. 26, 2023

(30) Foreign Application Priority Data
Sep. 24, 2020   (DE) .................... 10 2020 211 973.2

(51) Int. Cl.
*F16D 15/00*       (2006.01)
*F16D 23/12*       (2006.01)
*F16H 63/30*       (2006.01)

(52) U.S. Cl.
CPC .......... *F16D 15/00* (2013.01); *F16H 63/3043* (2013.01); *F16D 2023/123* (2013.01); *F16H 2063/3056* (2013.01)

(58) Field of Classification Search
CPC .... F16D 2023/123; F16D 23/12; F16C 19/08; F16C 19/10; F16C 19/55
See application file for complete search history.

(56) References Cited

U.S. PATENT DOCUMENTS 5,485,904 A * 1/1996 Organek ................ F16D 47/04
                                                     192/84.1
10,030,697 B2   7/2018 Carr et al.
(Continued)

FOREIGN PATENT DOCUMENTS

CN       207906317 U  *  9/2018 ............ F16D 23/12
DE  10 2009 021 874 A1   11/2010
(Continued)

OTHER PUBLICATIONS

European Patent Office, International Search Report issued in International patent application No. PCT/EP2021/074696 (Jan. 25, 2022).
(Continued)

*Primary Examiner* — Ernesto A Suarez
*Assistant Examiner* — Lillian T Nguyen
(74) *Attorney, Agent, or Firm* — Finch & Maloney PLLC

(57) ABSTRACT

An actuating device for a transmission has an adjusting element which can be moved in rotation by way of an actuator. At least one actuating element is arranged on one side of the adjusting element and can be moved in translation as a function of a rotation movement of the adjusting element. Roller bodies between the adjusting element and the actuating element concerned are arranged in such manner that each roller body engages in a ramp-shape contoured groove of the adjusting element and in a ramp-shape contoured groove of the actuating element concerned. The roller bodies, which are arranged between the adjusting element and the actuating element concerned, are arranged in at least two concentric roller body rings. Alternatively, or in addi-
(Continued)

tion, bearing bodies which serve to support the adjusting element on a housing-side base element are arranged in at least two concentric bearing body rings.

11 Claims, 3 Drawing Sheets

(56) References Cited

U.S. PATENT DOCUMENTS

| | | |
|---|---|---|
| 10,221,899 B2 | 3/2019 | Moubarak et al. |
| 2005/0050973 A1* | 3/2005 | Olschewski .......... F16H 25/125 |
| | | 74/57 |
| 2016/0327092 A1* | 11/2016 | Carr ........................ F16D 23/12 |
| 2017/0299024 A1* | 10/2017 | Yoshioka ................ F16H 13/08 |
| 2020/0256401 A1* | 8/2020 | Barnes .................... F16D 13/52 |
| 2020/0263744 A1 | 8/2020 | Fitz et al. |

FOREIGN PATENT DOCUMENTS

| | | | |
|---|---|---|---|
| DE | 10 2016 208 788 A1 | 11/2017 | |
| EP | 2466162 A1 * | 6/2012 | ............. F16D 13/52 |

OTHER PUBLICATIONS

European Patent Office, Written Opinion issued in International patent application No. PCT/EP2021/074696 (Jan. 25, 2022).

* cited by examiner

ACTUATING DEVICE FOR A TRANSMISSION

RELATED APPLICATIONS

This application claims the benefit under 35 U.S.C. § 371 as a U.S. National Phase Application of application no. PCT/EP2021/074696, filed on 8 Sep. 2021, which claims the benefit of German Patent Application no. 10 2020 211 973.2, filed 24 Sep. 2020, the contents of which are hereby incorporated herein by reference in their entireties.

FIELD OF THE DISCLOSURE

The invention relates to an actuating device for a transmission.

BACKGROUND

DE 10 2016 208 788 A1 discloses an actuating device for a transmission, which serves to actuate two shifting elements of the transmission. The actuating device comprises an adjusting element with an actuating element arranged on each side of the adjusting element. Between the adjusting element and the respective actuating element, roller bodies are arranged in each case, namely, first roller bodies between the adjusting element and a first actuation element and second roller bodies between the adjusting element and a second actuation element. The roller bodies engage partially in grooves of the adjusting element, which have a ramp-shaped contour, and in grooves of the respective actuation element, which also have a ramp-shaped contour, wherein the groove bottom of each groove is ramp-shaped. By displacing the adjusting element, the respective actuation element can be adjusted in order to actuate a particular shifting element by means of the actuation element.

When an adjustment element of a transmission is actuated, for example the actuation of a brake or a clutch of the transmission, large forces and torques are be transmitted by the actuating device. Heavy loading of the actuating device can result in wear and failure of the device. There is therefore a need to reduce the risk of wear and failure of an actuating device for a transmission.

SUMMARY

The purpose of the present invention is to provide a new type of actuating device for a transmission.

This objective is achieved by an actuating device for a transmission as variously disclosed herein.

In one embodiment of the actuating device; roller bodies arranged between the adjusting element and the actuating element concerned are fitted into at least two concentric roller body rings.

If the roller bodies are fitted into at least two roller body rings arranged between the adjusting element and the actuating element concerned, the load acting upon the individual roller bodies can be reduced. The risk of wear and hence failure is reduced thereby for the roller bodies and thus for the actuating device as a whole.

In another embodiment of the actuating device, bearing bodies which serve to support the adjusting element against a base element on the housing side are arranged in at least two concentric bearing body rings.

When the bearing bodies which serve to support the adjusting element against the base element on the housing side are arranged in at least two concentric bearing body rings, the load on the individual bearing bodies can be reduced. In that way the risk of wear and hence failure is reduced for the roller bodies and thus for the actuating device as a whole.

Preferably, an actuating device combines the features of the actuating devices discussed above.

Additional embodiments and further developments will emerge from the description given below.

BRIEF DESCRIPTION OF THE DRAWINGS

Example embodiments of the invention, to which it is not limited, are described in greater detail with reference to the drawing, which shows.

DETAILED DESCRIPTION

The invention relates to an actuating device for a transmission. FIGS. 1 to 5 show various views and details of a preferred example embodiment of an actuating device 10 for a transmission of a motor vehicle. The actuating device 10 preferably serves for actuating a frictional shifting element of the transmission, for example actuating a clutch or a brake.

The actuating device 10 of FIGS. 1 to 5 comprises an adjusting element 11. The adjusting element 11 can be moved in rotation by way of an actuator 12.

Figure 8:
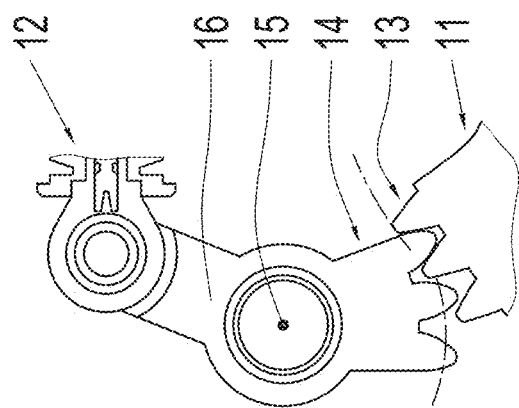
FIG. 8: An actuator for actuating the actuating devices according to the invention.

FIG. 8 shows a section of the adjusting element 11 together with an actuator 12 for moving the adjusting element 11 in rotation. Radially on the outside the adjusting element 11 has a toothed section 13 by way of which the adjusting element 11 is functionally connected to the actuator 12. As shown in FIG. 8 the actuator 12 also has a toothed section 14 which engages with the toothed section 13 of the adjusting element 11. This toothed section 14 of the actuator 12 is formed on a lever 16 of the actuator 12 mounted to pivot about a rotation axis 15, and the actual actuator 12 itself, for example a motor, engages with this pivotable lever 16.

The actuating device 10 of FIGS. 1 to 5 comprises an actuating element 17, which is arranged on an axial side of the adjusting element 11. The actuating element 17 can be moved as a function of the rotation movement of the adjusting element 11, namely, moved by translation in the axial direction in order to actuate a shifting element of the transmission.

Roller bodies 18 are arranged between the adjusting element 11 and the actuating device 10. Each roller body 18 engages on one side with a groove 19 contoured in a ramp shape on one axial side of the adjusting element 11 and on the other side in a groove 20 contoured in a ramp shape on an axial side of the actuating element 17, where a groove contoured in a ramp shape means that the so-termed groove bottoms of these grooves 19 and 20 are formed as ramps. As a result of the ramp-like contouring of the grooves 19 and 20 the rotational movement of the adjusting element 11 can be converted particularly advantageously into a translation movement of the actuating element 17.

In the example embodiment shown, the roller bodies 18 are positioned in a roller body ring 21, and the roller bodies 18 arranged in the roller body ring 21 are held in by a cage 22.

In the actuating device 10 shown in FIGS. 1 to 5, a housing-side base element 23 is positioned at an opposite axial side of the adjusting element 11 which is opposite the axial side on which the actuating element 17 is arranged. The housing-side base element 23 is for example mounted on a transmission housing. The housing-side base element 23 is positionally fixed.

The adjusting element 17 is mounted rotatably relative to the housing-side base element 23 by means of bearing bodies 24. The bearing bodies 24 are roller bearing bodies.

To reduce the wear on the bearing bodies 24 caused by the high forces and torques to be transmitted, in the actuating device 10 of FIGS. 1 to 5 it is provided that the bearing bodies 24 are arranged in at least two concentric bearing body rings 25, 26. In the example embodiment shown in FIGS. 1 to 5 the bearing bodies are arranged in two concentric bearing body rings 25, 26, such that the bearing body ring 25 has a larger diameter than the bearing body ring 26.

Figure 3:
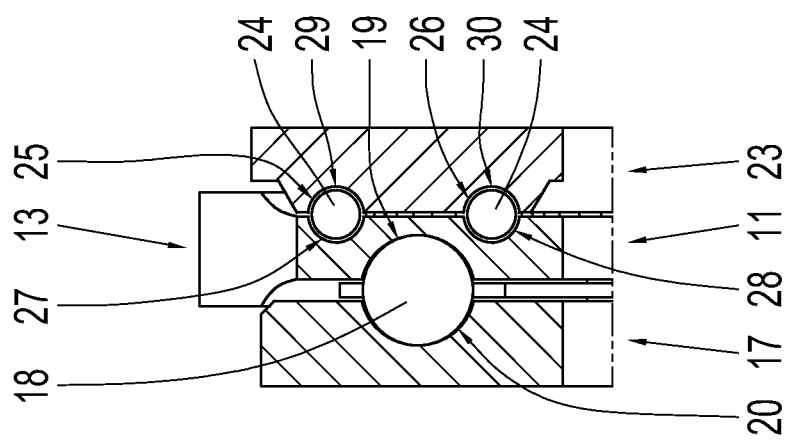
FIG. 3: A detail of FIG. 2.
Figure 2:
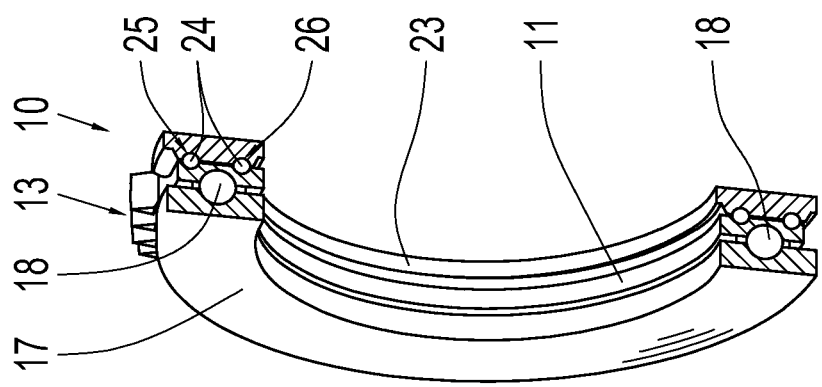
FIG. 2: A cross-section through the actuating device shown in FIG. 1.
Figure 1:
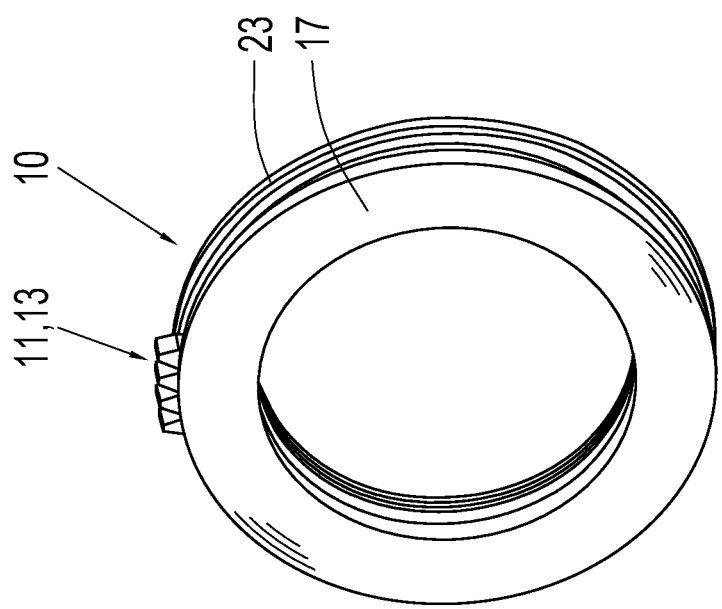
FIG. 1: A perspective view in the axial direction, of an actuating device according to the invention for a transmission.
Figure 5:
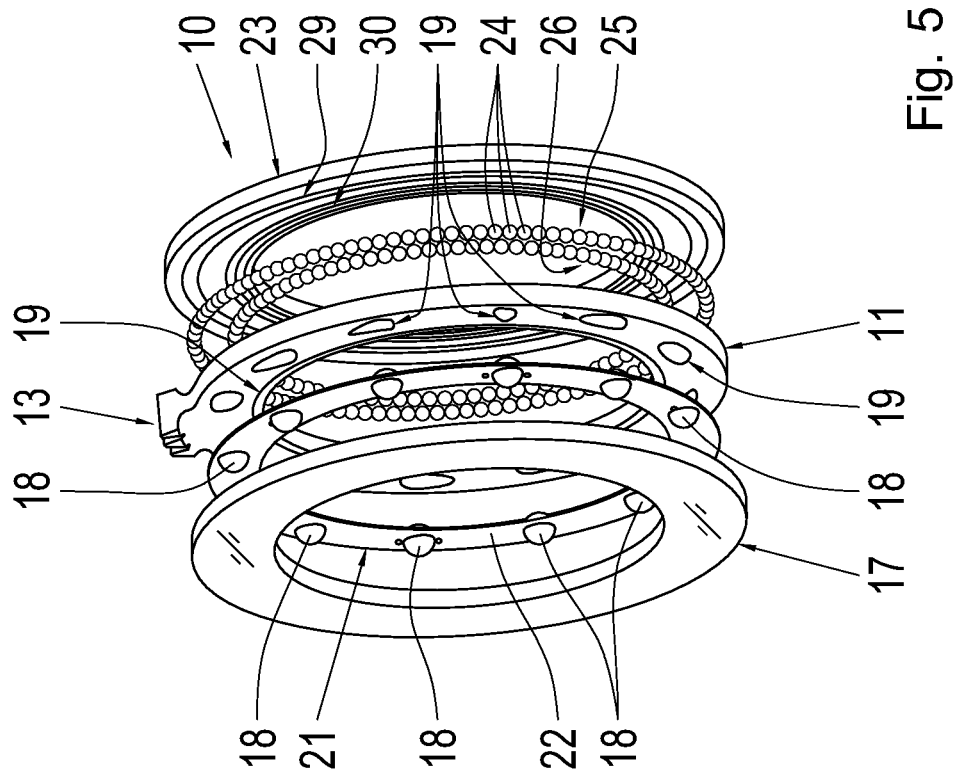
FIG. 5: A second exploded view of the actuating device in FIG. 1.
Figure 4:
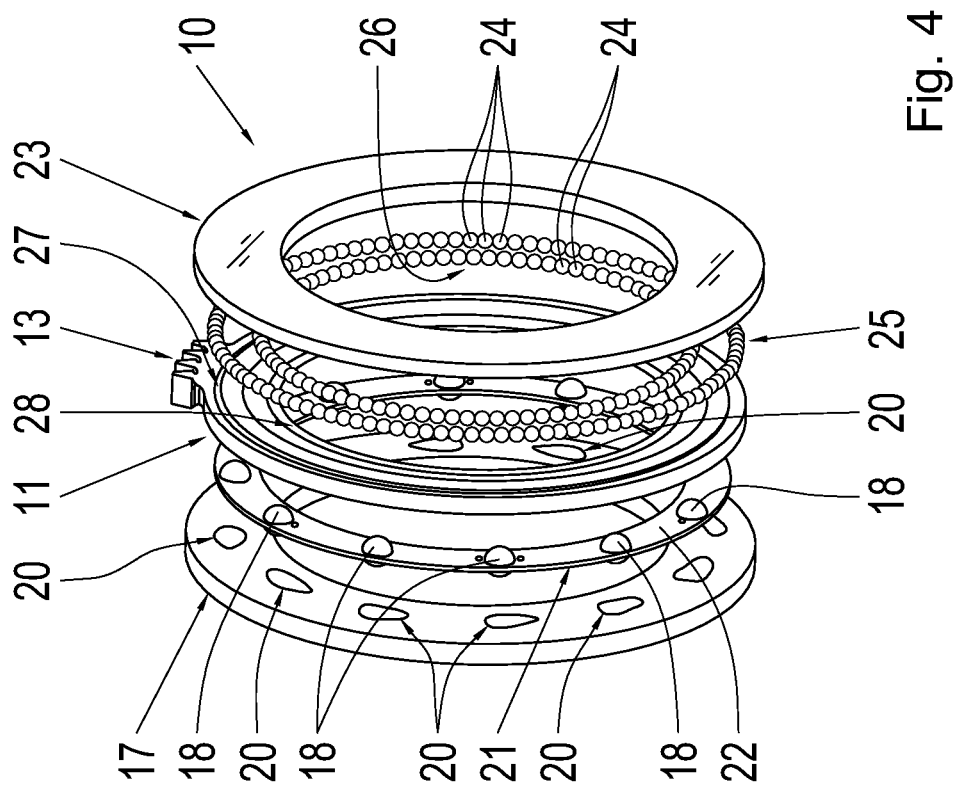
FIG. 4: A first exploded view of the actuating device in FIG. 1.

As can be seen most clearly in FIG. 3, the individual bearing bodies 24 of the bearing body rings 25, 26 engage in grooves of the adjusting element 11 and of the base element 23, namely, in concentric grooves 27, 28 of the adjusting element 11 and in concentric grooves 29, 30 of the base element 23. Thus, the bearing bodies 24 of the larger, radially outer bearing body ring 25 engage in a respective groove 27 of the adjusting element 11 and in a respective groove 29 of the base element 23. The bearing bodies 24 of the radially inner bearing body ring 26 engage in a respective groove 28 of the adjusting element 11 and in a respective groove 30 of the base element 23. These grooves 27, 28, 29, 30 extend all round in the circumferential direction and are not contoured in ramp shapes. In each of these grooves a plurality of bearing bodies 24 engage, namely, the bearing bodies of the bearing body ring 25, 26 concerned.

Figure 7:
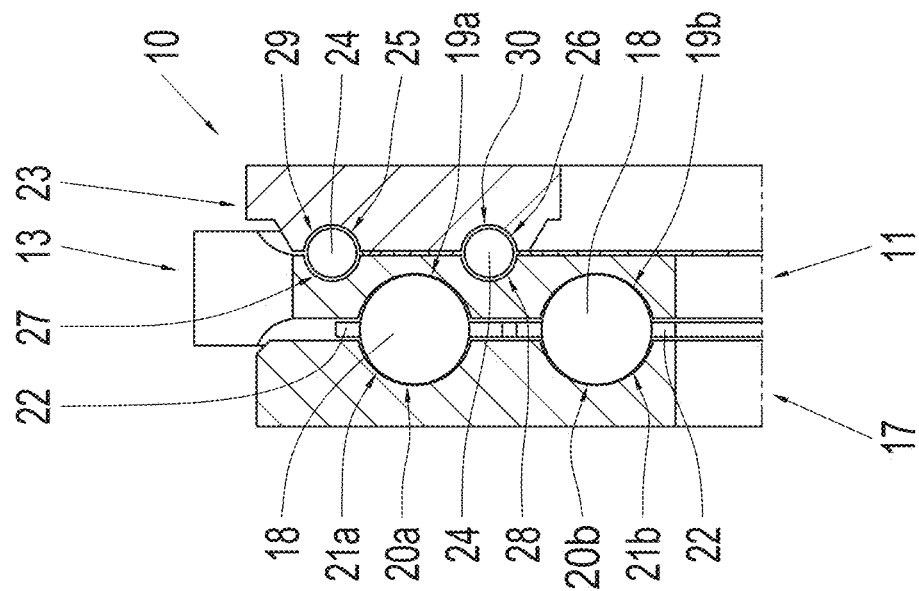
FIG. 7: A detail of FIG. 6.
Figure 6:
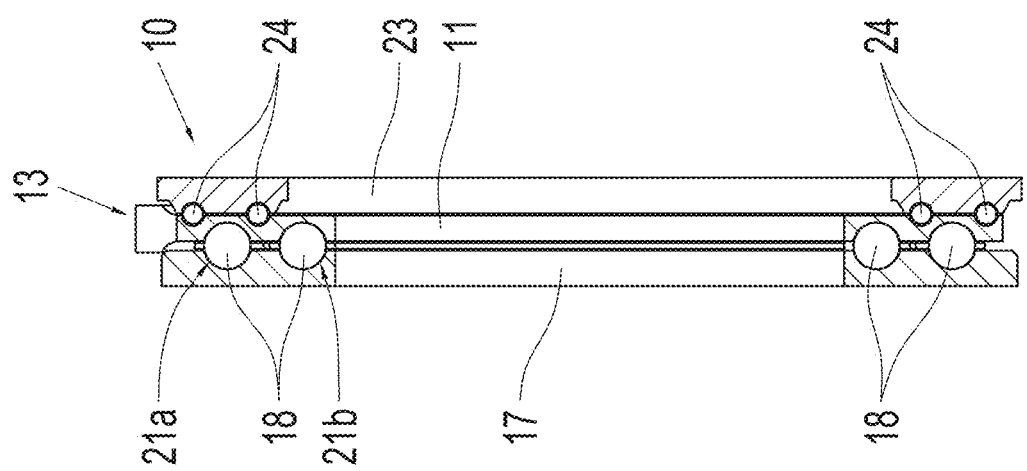
FIG. 6: A cross-section through a further actuating device according to the invention.

FIGS. 6 and 7 show a further development of the actuating device 10 shown in FIGS. 1 to 5, in which the roller bodies 18 are again arranged between the adjusting element 11 and the actuating element 17 in at least two concentric roller body rings 21a, 21b, and indeed in FIGS. 6 an 7 in two roller body rings 21a, 21b which are arranged concentrically with one another, wherein the radially outer roller body ring 21a has a larger diameter than the radially inner roller body ring 21b. The roller bodies 18 of each roller body ring 21a, 21b are held in by a cage in each case. The roller bodies 18 of each roller body ring 21a, 21b engage in corresponding grooves 19a, 19b and 20a, 20b of the adjusting element 13 and the actuating element 17. The groove bottoms of these grooves are contoured in a ramp shape. These grooves do not extend all round in the circumferential direction. Each roller body 18 preferably engages in a groove of its own. Thus, the roller bodies 18 of the larger, radially outer roller body ring 21a engage in respective grooves 19a of the adjusting element 11 and in respective grooves 20a of the pressure element 17. When the roller bodies 18 arranged between the adjusting element 11 and the actuating element 17 are seated in at least two concentric roller body rings 21a, 21b, the risk of wear can be reduced for the actuating device 10 as well.

In the example embodiment shown in FIGS. 1 to 5, there are two bearing body rings 25 and 26 and also a roller body ring 21. In the example embodiment of FIGS. 6 and 7 there are two bearing body rings 25, 26 and two roller body rings 21a 21b. Although this is not illustrated in the figures, a variant of the invention is also conceivable in which only one bearing body ring is present but several, in particular two, roller body rings are present. There can also be more than two bearing body rings between the adjusting element 11 and the base element 23, and more than two roller body rings between the adjusting element 11 and the actuating element 17.

In the example embodiments illustrated, the actuating element 17, the adjusting element 11 and the base element 23 are each in the form of annular plate elements. Thus, the actuating element 17 is in the form of an annular pressure plate, the adjusting element 11 is an annular adjustment plate and the base element is an annular base plate. Here, when viewed in the axial direction in FIGS. 1 to 7 the adjusting element 13 is in each case positioned sandwich-like between the actuating element 17 and the base element 23. The grooves 19, 19a, 19b, 20, 20a, 20b of the actuating element 17 and the adjusting element 11 in which the roller bodies 18 engage, and the grooves 27, 28, 29, 30 of the adjusting element 11 and the base element 23, in which the bearing bodies 24 engage, are formed in axial sides of the elements 17, 13, 23 that face toward one another. The ramp slopes of the ramp-like contoured groove bottoms of the grooves 19, 19a, 19b, 20, 20a, 20b extend in the axial direction.

The invention, which uses several roller body rings and/or several bearing body rings, can also be used in an actuating device which comprises more than one actuating element. For example, the invention can also be used with the actuating element of DE 10 2016 208 788 A1.

With the invention the loads that act during operation upon the bearing bodies and/or roller bodies can be reduced. Thereby, the susceptibility of the actuating device to wear and failure are reduced.

INDEXES

10 Actuating device
11 Adjusting element
12 Actuator
13 Toothed section
14 Toothed section
15 Rotation axis
16 Lever
17 Adjusting element
18 Roller body
19 Groove
19a Groove
19b Groove
20 Groove
20a Groove
20b Groove
21 Roller body ring
21a Roller body ring
21b Roller body ring
22 Cage
23 Base element
24 Bearing body
25 Bearing body ring
26 Bearing body ring
27 Groove 28 Groove
29 Groove
30 Groove

The invention claimed is:

1. An actuating device for a transmission, comprising:
an adjusting element configured to be moved in rotation by way of an actuator, the adjusting element having a first axial side defining inner grooves and outer grooves, the inner and the outer grooves in the first side of the adjusting element having ramp-shaped contours;
at least one actuating element arranged on the first axial side of the adjusting element and configured to be translated as a function of a rotation movement of the adjusting element, the at least one actuating element defining inner grooves and outer grooves, the inner and the outer grooves of the at least one actuating element having ramp-shaped contours;
first and second roller body rings, the first roller body ring having a smaller diameter than the second roller body ring, and the first and the second roller body rings are concentric and radially aligned such that the first roller body ring is located within the second roller body ring;
first roller bodies are arranged in the first roller body ring, and second roller bodies are arranged in the second roller body ring; and
the first roller body ring and the second roller body ring are axially arranged between the first side of the adjusting element and the at least one actuating element, wherein each of the first roller bodies engages in the inner grooves in the first side of the adjusting element and in the inner grooves of the actuating element and each of the second roller bodies engages in the outer grooves in the first side of the adjusting element and in the outer grooves of the actuating element.

2. The actuating device according to claim 1, further comprising:
first and second bearing body rings, the first bearing body ring having a smaller diameter than the second bearing body ring, and the first and the second bearing body rings are concentric and radially aligned such that the first bearing body ring is located within the second bearing body ring;
a plurality of bearing bodies are arranged in the first bearing body ring, and a plurality of bearing bodies are arranged in the second bearing body ring, the bearing bodies in the respective first and the second bearing body rings are configured and arranged to support the adjusting element on a housing-side base element.

3. The actuating device according to claim 1, further comprising at least one cage, wherein each of the first and the second roller bodies of the respective first and second roller body rings is guided in a respective cage of the at least one cage.

4. The actuating device according to claim 1, wherein:
the adjusting element is configured as an annular adjusting plate;
the at least one actuating element has a single actuating element in the form of an annular pressure plate;
the single actuating element is arranged on the first axial side of the annular adjusting plate;
a base element is configured as an annular base plate and is arranged on an opposite, second axial side of the annular adjusting plate;
the first and the second roller bodies are arranged between the actuating element and the first axial side of the adjusting element; and
a radially outer portion of the adjusting element includes a toothed section configured to functionally connect the adjusting element with the actuator.

5. The actuating device according to claim 4, wherein bearing bodies are arranged between the base element and the second axial side of the adjusting element.

6. An actuating device for a transmission, comprising:
an adjusting element configured to be moved in rotation by way of an actuator, the adjusting element defining a groove having a ramp-shaped contour;
at least one actuating element arranged on a first axial side of the adjusting element and configured to be displaced in translation as a function of a rotation movement of the adjusting element, a first axial side of the at least one actuating element defining a groove having a ramp-shaped contour, a second axial side of the adjusting element having radially inner and outer annular grooves that extend all around the adjusting element in a circumferential direction;
first roller bodies arranged between the adjusting element and the at least one actuating element wherein each of the first roller bodies engages in the groove of the adjusting element and in the groove of the actuating element;
at least two concentric bearing body rings;
each of the bearing body rings has a plurality of bearing bodies configured and arranged to support the adjusting element on a housing-side base element, the housing-side base element has a surface that faces the second side of the adjusting element and has radially inner and outer annular grooves that extend all around the housing-side base element in a circumferential direction, the adjusting element and the housing-side base element are arranged such that the inner and the outer annular grooves of the adjusting element align with the inner and the outer annular grooves of the housing-side base element, the at least two concentric bearing body rings are arranged between the second side of the adjusting element and the housing-side base element such that the bearing bodies of the bearing body rings engage within the inner and the outer annular grooves of the adjusting element and the inner and the outer annular grooves of the housing-side base element.

7. The actuating device according to claim 6, further comprising at least two concentric roller body rings, wherein the first roller bodies are arranged in the at least two concentric roller body rings.

8. The actuating device according to claim 7, further comprising at least one cage, wherein each of the first roller bodies of the respective roller body rings is guided in a cage of the at least one cage.

9. The actuating device according to claim 6, further comprising at least one cage, wherein each of the first roller bodies of respective roller body rings is guided in a cage of the at least one cage.

10. The actuating device according to claim 6, wherein:
the adjusting element is configured as an annular adjusting plate;
the at least one actuating element has a single actuating element in the form of an annular pressure plate;
the single actuating element is arranged on a first axial side of the annular adjusting plate;
the housing-side base element is configured as an annular base plate and is arranged on the second side of the annular adjusting plate that is axially opposite the first axial side of the annular adjusting plate;

the first roller bodies are arranged between the actuating element and the adjusting element; and a radially outer portion of the adjusting element has a toothed section configured to functionally connect the adjusting element with the actuator.

11. The actuating device according to claim 10, wherein the bearing bodies are arranged between the base element and the adjusting element.

\* \* \* \* \*